(No Model.)
J. L. PAYNTER.
PULVERIZING CULTIVATOR.
No. 360,109. Patented Mar. 29, 1887.
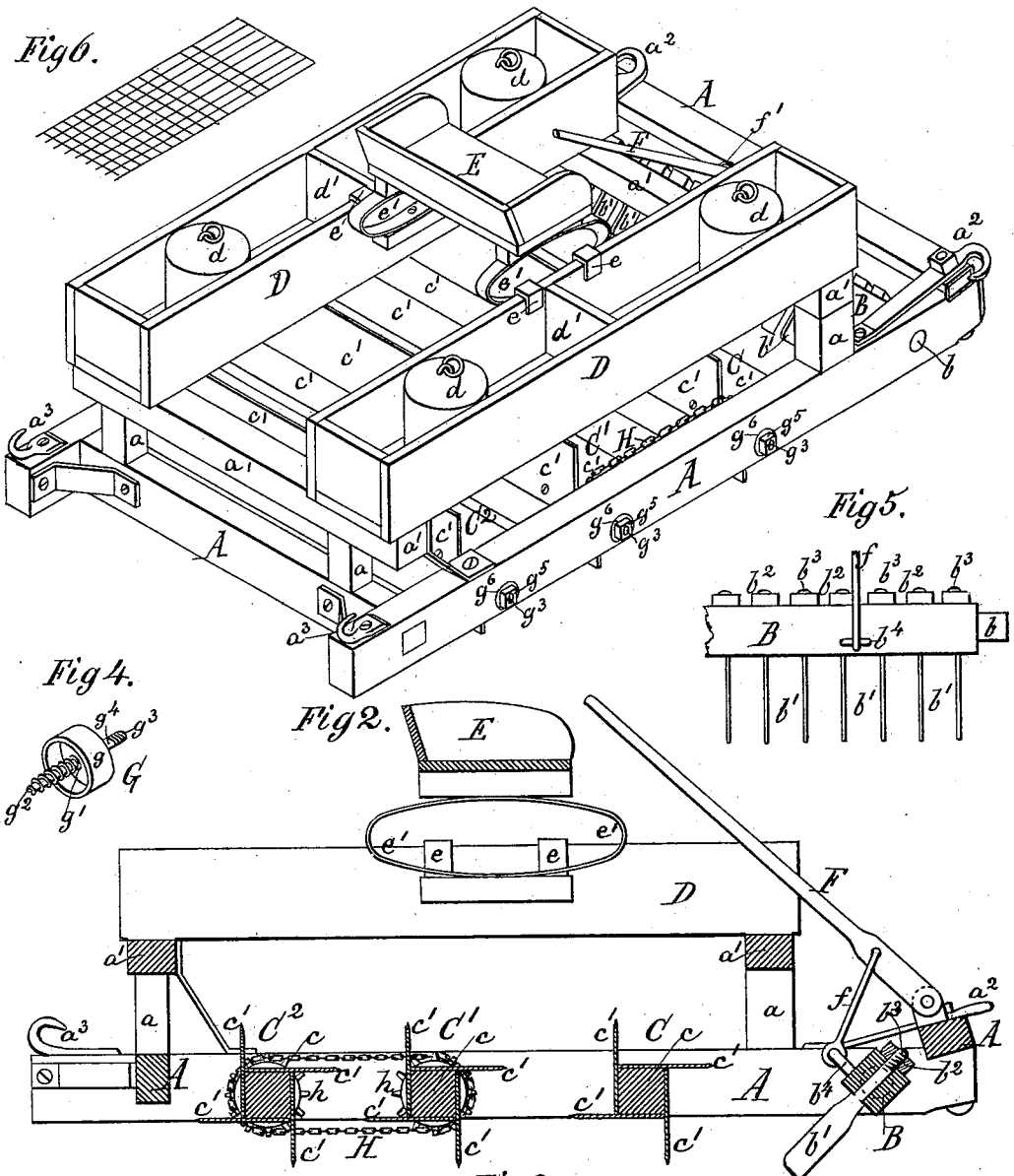
Witnesses:
R. L. Fenwick
J. P. Theo. Lang
Inventor:
Jacob L. Paynter
by his Atty.
Maun, Fenwick & Lawrence ic
UNITED STATES PATENT OFFICE.

JACOB L. PAYNTER, OF SALEM, INDIANA, ASSIGNOR OF ONE-HALF TO JOHN P. KYTE, OF SAME PLACE.

PULVERIZING-CULTIVATOR.

SPECIFICATION forming part of Letters Patent No. 360,109, dated March 29, 1887.

Application filed November 18, 1886. Serial No. 219,273. (No model.)

*To all whom it may concern:*

Be it known that I, JACOB L. PAYNTER, a citizen of the United States, residing at Salem, in the county of Washington and State of Indiana, have invented certain new and useful Improvements in Pulverizing-Cultivators; and I do hereby declare the following to be a full, clear, and exact description of the invention, such as will enable others skilled in the art to which it appertains to make and use the same.

My invention relates to soil-pulverizers; and it consists in certain constructions, combinations, and arrangements of parts, hereinafter fully described, and pointed out in the claims, whereby an improved machine is produced which divides the ground or soil very finely and equally and leaves it with very even surface.

In the accompanying drawings, Figure 1 is a perspective view of my invention. Fig. 2 is a vertical longitudinal section of the same near its center line. Fig. 3 is a detail view of one of the revolving cutters used in the same. Fig. 4 is a perspective view of one of the metallic end bearings of the same. Fig. 5 is a rear view of a portion of the harrow-bar and cutters attached thereto as used in my invention, and Fig. 6 is a diagram of the marks made in the ground by my machine.

In the drawings, A represents an oblong frame, B a cutter-bar, C C' C² revolving cutters, D weight-receptacles, and E the seat.

The frame A is provided with posts $a$ and transverse beams $a'$, whereby the two boxes or receptacles D are supported and held at a suitable elevation above the frame A. These receptacles D are provided with weights $d$, which are prevented from unduly moving about by means of suitable partitions, $d'$, formed in the said receptacles. A seat, E, with springs $e'$, is provided for the operator, and hung between the receptacles D by means of hooks $e$, the seat being adjustable along the parallel sides of the receptacles, as shown.

The front portion of the frame A is provided with draft-hooks $a^2$, and the rear portion is provided with hooks $a^3$, to which latter a harrow or harrows may be attached whenever desirable. A transverse bar, B, is hung to the front portion of the frame A by means of journals $b$, said bar being provided with knives or cutters $b'$, inserted into the bar and fastened thereto by means of nuts $b^2$, applied to their screw-threaded shanks $b^3$, as seen in Fig. 2. The bar B is turned by means of an eyebolt, $b^4$, suitably fastened to it, which eyebolt is operated by means of a hand-lever, F, and connecting-rod $f$. When the hand-lever F is swung forward to the limit of its throw, the cutters $b'$ are turned up backward to a more or less horizontal position, out of contact with the ground; but when the hand-lever F is swung toward the driver's seat E, as shown in Figs. 1 and 2, the cutters $b'$ assume an oblique position toward the ground, thus enabling them to enter the ground to a suitable depth when the machine is in operation. In this latter position the hand-lever F may be secured by means of a retaining hook or hooks, $f'$, attached to the side of one of the receptacles D.

In rear of the cutter-bar B the three transverse revolving cutters C C' C² are hung to the frame A. The body portion $c$ of these cutters is in square form, as shown, and to each surface of the same a sheet-blade, $c'$, is tangentially attached, so that in entering the ground said blades do not shave it and carry the top soil with them, but make at once a downward cut, and in doing so bury the weeds into the ground without lifting them while leaving the ground. The end portions $c^2$ of the body portion $c$ are cylindrical and are provided with caps G. (Shown in detached view in Fig. 4.) These caps consist of a cap portion, $g$, fitted upon the end portion $c^2$, and a central or axial rod, $g^4$, formed thereon, both ends of which are screw-threaded, as at $g^2$ $g^3$. The screw-threaded end portion $g^2$ is firmly screwed into the end portion $c^2$, while the portion $g^4$, between the screw-threaded end portion $g^3$ and the cap portion $g$, serves as a journal of the revolving cutter and is suitably hung in the frame A. The screw-threaded end portion $g^3$ is provided with a nut, $g^5$, which bears against a washer, $g^6$, interposed between it and the frame A.

The cutters C C' and C' C² are geared together by means of endless chains H and sprocket-wheels $h$, the latter being attached to the cap portions $g$ aforesaid, and the blades $c'$ of the several cutters are so arranged that the spaces between the marks upon the ground made by the front cutter, C, are subdivided by the blades of the rear cutters into equidistant marks. This object is attained by hanging the cutters at distances from each other answering said subdivisions, and accordingly the marks of the front cutter, C, and those of the middle cutter, C', will stand one-third apart, and the marks of the front cutter, C, and rear cutter, $C^2$, will stand two-thirds apart, thus dividing each two consecutive marks of the front cutter, C, into three equal parts.

The cutters $b'$ are arranged at distances equal, or nearly so, to the distances of the marks made by the blades $c'$, and thus the ground is divided up into squares sufficiently small to be easily reduced to powder by the crushing action of the blades $c'$ while changing from vertical to inclined positions. According to the condition of the ground, a greater or less number of weights $d$ are placed in the receptacles D, so as to secure the necessary force to the cutters of the pulverizer required for the desired depth of the top-dressing of the land.

What I claim is—

1. In a soil-pulverizer, the combination of a transverse radially-adjustable cutter-bar having cutters $b'$ and revolving transverse blades $c'$ on cutters spaced unequally and geared together, substantially as and for the purpose described.

2. In a pulverizer, the cutters C C' $C^2$, revolving at equal rates of speed and arranged at unequal distances apart, and producing transverse cuts which are very short and at equal distances apart, substantially as described.

3. In a pulverizer, the combination of the adjustable cutters $b'$, revolving cutters C C' $C^2$, and partitioned weight-receptacles D, substantially as and for the purpose described.

4. In a pulverizer, the revolving blades $c'$, attached tangentially to the sides of the body portion $c$ of the cutter C, substantially as and for the purpose described.

5. The combination of the weight-receptacles and adjustable spring-seat E, having hooks $e$, substantially as and for the purpose described.

6. In a pulverizer, as described, the frame A, having rear hooks, $a^3$, substantially as and for the purpose described.

7. The cutters C C' $C^2$, having a flat-sided body portion, $c$, and journal-caps G, substantially as and for the purpose described.

In testimony whereof I affix my signature in presence of two witnesses.

JACOB L. PAYNTER.

Witnesses:
C. C. HAUGER,
E. CRAYCROFT.